United States Patent
Nguyen

(10) Patent No.: US 11,988,936 B1
(45) Date of Patent: May 21, 2024

(54) ELECTROCHROMIC DEVICES HAVING REDUCED SWITCHING TIMES AND THEIR METHODS OF MANUFACTURE

(71) Applicant: Que Anh S. Nguyen, San Jose, CA (US)

(72) Inventor: Que Anh S. Nguyen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 16 days.

(21) Appl. No.: 17/862,616

(22) Filed: Jul. 12, 2022

Related U.S. Application Data

(63) Continuation of application No. 16/827,984, filed on Mar. 24, 2020, now Pat. No. 11,442,326, which is a continuation of application No. 15/948,360, filed on Apr. 9, 2018, now Pat. No. 10,634,971, which is a continuation of application No. 15/270,698, filed on Sep. 20, 2016, now Pat. No. 9,939,703.

(60) Provisional application No. 62/234,319, filed on Sep. 29, 2015.

(51) Int. Cl.
| | |
|---|---|
| G02F 1/155 | (2006.01) |
| B05D 3/06 | (2006.01) |
| G02F 1/1343 | (2006.01) |
| G02F 1/153 | (2006.01) |
| G02F 1/163 | (2006.01) |

(52) U.S. Cl.
CPC .............. *G02F 1/155* (2013.01); *B05D 3/06* (2013.01); *G02F 1/134309* (2013.01); *G02F 1/153* (2013.01); *G02F 1/163* (2013.01); *G02F 2001/1555* (2013.01)

(58) Field of Classification Search
CPC .... G02F 1/155; G02F 1/134309; G02F 1/153; G02F 1/163; G02F 2001/1555; B05D 3/06
USPC .................................................. 359/265–275
See application file for complete search history.

(56) References Cited

U.S. PATENT DOCUMENTS

| | | |
|---|---|---|
| 4,644,344 A | 2/1987 | Larsen et al. |
| 4,768,865 A | 9/1988 | Greenberg et al. |
| 5,293,546 A | 3/1994 | Tadros et al. |
| 5,585,958 A * | 12/1996 | Giraud ............... G02F 1/155 |
| | | 359/275 |
| 5,608,995 A | 3/1997 | Borden |
| 5,679,283 A | 10/1997 | Tonar et al. |
| 5,928,572 A | 7/1999 | Tonar et al. |
| 6,045,643 A | 4/2000 | Byker et al. |
| 6,239,898 B1 | 5/2001 | Byker et al. |
| 6,433,913 B1 | 8/2002 | Bauer et al. |
| 6,449,082 B1 | 9/2002 | Agrawal et al. |
| 7,256,924 B2 | 8/2007 | Guarr et al. |
| 8,508,830 B1 | 8/2013 | Wang |
| 2009/0262085 A1 | 10/2009 | Wassingbo et al. |
| 2012/0062976 A1 | 3/2012 | Burdis |
| 2012/0200908 A1 | 8/2012 | Bergh et al. |

(Continued)

*Primary Examiner* — William Choi
(74) *Attorney, Agent, or Firm* — Young Basile Hanlon & MacFarlane, P.C.

(57) ABSTRACT

An electrochromic device includes an optically active layer having an optical property that can be altered by application of electrical power to the optically active layer and a conductive structure that is configured to supply the electrical power to the optically active layer. The conductive structure includes patterned conductive elements that cooperate with the optically active layer to define electrochromic cells.

20 Claims, 4 Drawing Sheets

(56) References Cited

U.S. PATENT DOCUMENTS

2013/0057939 A1  3/2013  Yeh et al.
2014/0307302 A1* 10/2014  Andersson Ersman ..................... G02F 1/1533
                                                                   427/108

* cited by examiner

ELECTROCHROMIC DEVICES HAVING REDUCED SWITCHING TIMES AND THEIR METHODS OF MANUFACTURE

CROSS-REFERENCE TO RELATED APPLICATIONS

This application is a continuation of U.S. patent application Ser. No. 16/827,984, filed Mar. 24, 2020, which is continuation of U.S. patent application Ser. No. 15/948,360, filed Apr. 9, 2018, which is a continuation of U.S. patent application Ser. No. 15/270,698, filed Sep. 20, 2016, which claims the benefit U.S. Provisional Application Ser. No. 62/234,319, filed Sep. 29, 2015, all of which are hereby incorporated by reference in their entireties.

FIELD

The described embodiments relate generally to electrochromic devices, and more particularly, to electrochromic devices having patterned conductors for reducing switching times.

BACKGROUND

Electrochromic devices include an optically active layer disposed between two conductive layers. The two conductive layers are transparent, and during operation, apply voltages to the optically active layer. Such voltages correspond to electric fields passing through the optically active layer. The optically active layer is formed of materials whose light transmittance changes in response to applied electric fields. Thus, each applied voltage induces a transmissive state in the optically active layer. By selectively manipulating the applied voltage, electrochromic devices can switch into a desired transmissive state and regulate light passing therethrough. In general, increased voltages correspond to transmissive states that have a lower transmittance of light.

Electrochromic devices have been integrated into glass panes to produce so-called "smart windows" that selectively regulate light transmission. Within a "smart window," an electrochromic device spans a functional area of a glass pane, which can be the entirety of the pane. In this configuration, electrical coupling to conductive layers occurs from a perimeter of the glass pane, thereby requiring an electrical charge to move inward when voltages are applied. For this reason, conventional "smart windows" are observed to first darken (or lighten) from their edges to achieve a uniform transmissive state. This darkening (or lightening) then travels inward. Such an effect creates delays when switching between transmissive states.

The delayed switching times can be influenced by sheet resistances associated with the two conductive layers. In operation, electrical charges traveling inward from the perimeter must overcome a cumulative resistance that increases with distance. Thus, during operation, a voltage distribution across the two conductive layers is initially non-uniform, i.e., voltages experienced by the optically active layer can decrease when traveling inward and away from the perimeter. Thus, there is a need for electrochromic devices that reduce sheet resistance effects associated with the conductive layers.

SUMMARY

The embodiments described herein relate to electrochromic devices having reduced switching times, including methods for manufacturing such electrochromic devices. In one illustrative embodiment, the electrochromic device includes a transparent substrate having a surface. A first transparent conductive layer is disposed on a portion of the surface. The electrochromic device also includes an optically active layer disposed on the first transparent conductive layer. The optically active layer is configured to alter optical properties in response to an applied electric field (i.e., an applied voltage). A second transparent conductive layer is disposed on the optically active layer. The electrochromic device additionally includes a patterned conductive layer disposed on the second transparent conductive layer and defining an array on the second transparent conductive layer. The array partitions the electrochromic device into a plurality of electrochromic cells.

In another illustrative embodiment, the electrochromic device includes a glass substrate having a surface. A first transparent conductive layer is disposed on a portion of the surface. The electrochromic device also includes an optically active layer disposed on the first transparent conductive layer and having an electrochromic layer, an ion conductive layer, and an ion storage layer therein. The optically active layer is configured to alter an absorption spectrum of electromagnetic radiation in response to an applied electric field (i.e., an applied voltage). A second transparent conductive layer is disposed on the optically active layer. The electrochromic device additionally includes a patterned conductive layer disposed on the second transparent conductive layer, defining an array on the second transparent conductive layer. The array partitions the electrochromic device into a plurality of electrochromic cells. The electrochromic device also includes a glass superstrate having a portion bonded onto the patterned conductive layer.

In an additional illustrative embodiment, a method of manufacturing an electrochromic device includes forming an optically active layer onto a first transparent conductive layer. The optically active layer is configured to alter optical properties in response to an applied electric field. The first transparent conductive layer is disposed on a portion of a transparent substrate. The method also includes depositing a second transparent conductive layer onto the optically active layer and patterning a conductive material into an array on the second transparent conductive layer. The array partitions the electrochromic device into a plurality of electrochromic cells.

It will be appreciated that the patterned conductive layer has a greater conductivity than the second transparent conductive layer. This greater conductivity enables an alternate, lower-resistance electrical conduit that mitigates sheet resistance effects. Electrical charge can therefore reach areas throughout the second transparent conductive layer, but with minimal losses in voltage potential. Moreover, the plurality of electrochromic cells subdivides the electrochromic device into smaller regions, allowing the optically active layer to experience a more uniform voltage distribution. Deviations from the applied voltage are also significantly reduced. Thus, by virtue of the patterned conductive layer, the transmissive state emerges more evenly throughout the optically active layer and switching times between transmissive states are reduced. In some embodiments, features of the array are such that the patterned conductive layer is not visible to the naked eye. Other electrochromic devices and methods are presented.

BRIEF DESCRIPTION OF THE DRAWINGS

The disclosure will be readily understood by the following detailed description in conjunction with the accompa

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1A:
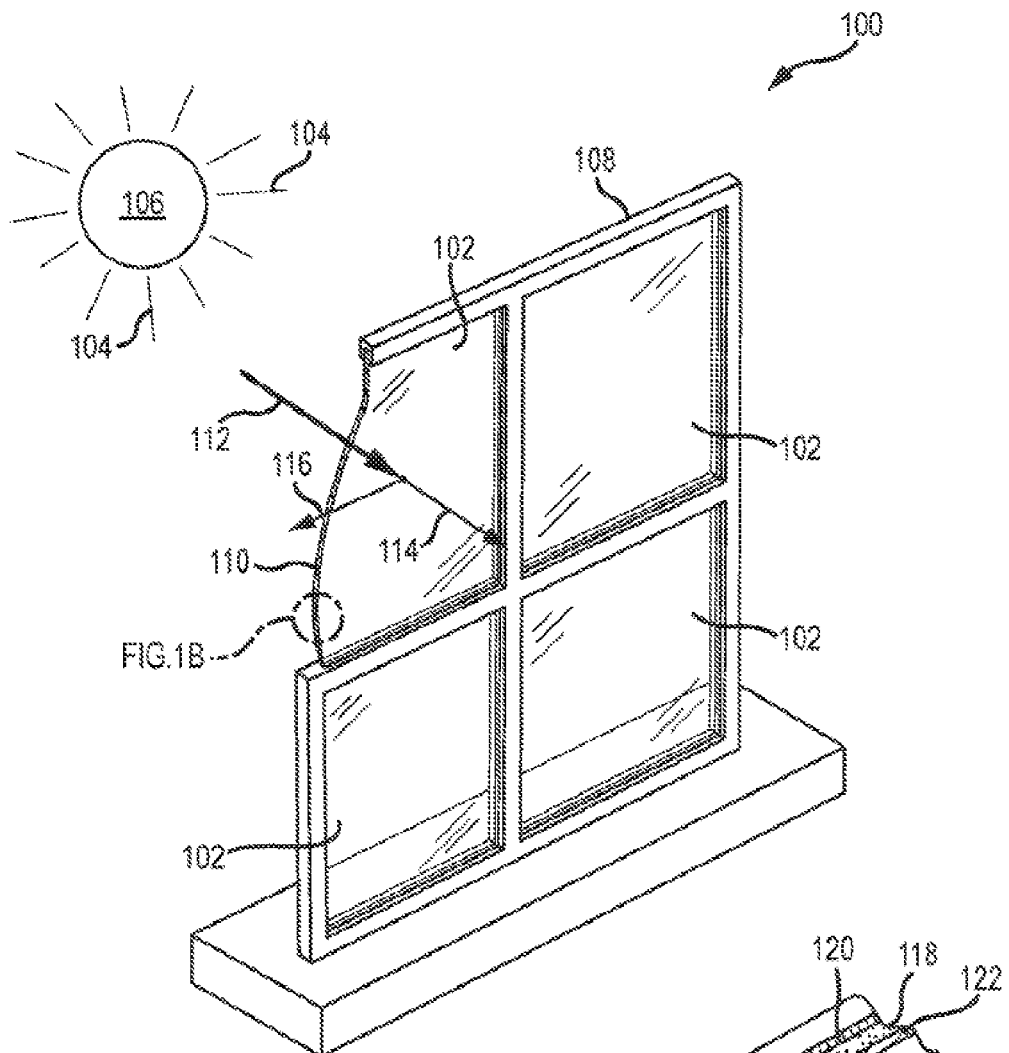
- FIG. 1A is a perspective view, with a portion shown in cross-section, of a window having a plurality of selectively transparent panels, according to an illustrative embodiment.

Referring to FIG. 1A, a perspective view is presented, with a portion shown in cross-section, of a window 100 having a plurality of selectively transparent panels 102, according to an illustrative embodiment. FIG. 1A presents the window 100 in the context of a building structure. However, other contexts are possible (e.g., vehicular windows). Moreover, the window 100 is depicted as being exposed to solar radiation 104 from the sun 106. This depiction, however, is not intended as limiting. The window 100, for example, could be disposed within an interior room of a building. Other environments are possible. The plurality of selectively transparent panels 102 have a planar configuration and are individually supported within a frame 108 of the window 100. It will be appreciated, however, that the plurality of selectively transparent panels 102 can have non-planar configurations (e.g., concave, convex, etc.). For example, and without limitation, the plurality of selectively transparent panels 102 could function as windows for a vehicle and have shapes that conform thereto (i.e., curved to match a profile of the vehicle An electrochromic device 110 can be incorporated into each of the plurality of selectively transparent panels 102. The electrochromic device 110 interacts with an incoming light 112 that enters the window 100. For purposes of clarity, FIG. 1A depicts only one selectively transparent panel 102 interacting with the incoming light 112. However, it will be understood that all panels 102 of the plurality of selectively transparent panels 102 are capable of interacting with the incoming light 112. Interaction of the electrochromic device 110 with the incoming light 112 produces a transmitted light 114. The transmitted light 114 can be reduced in intensity relative to the incoming light 112. However, the electrochromic device 110 may also alter a spectral distribution, a polarization, or both, of the incoming light 112 to produce the transmitted light 114. In some embodiments, interaction of the electrochromic device 110 with the incoming light 112 may also produce a reflected light 116. Non-limiting examples of the incoming light 112 include the sun, incandescent lamps, fluorescent lamps, LED lamps, and combustion lamps. Other sources for the incoming light 112 are possible.

Figure 1B:
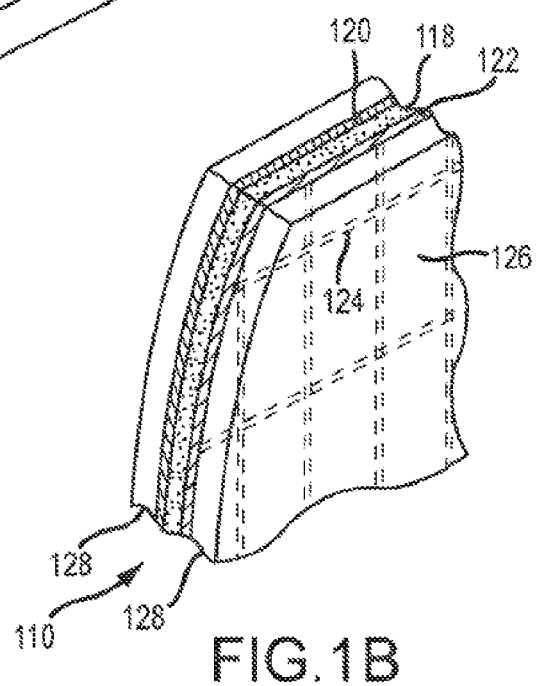
FIG. 1B is a detail view, shown in cross-section, of an electrochromic device incorporated into each of the plurality of selectively transparent panels of FIG. 1A, according to an illustrative embodiment.

FIG. 1B presents a detail view, shown in cross-section, of the electrochromic device 110 incorporated into each of the plurality of selectively transparent panels 102 of FIG. 1A. The electrochromic device 110 includes an optically active layer 118 disposed between a first transparent conductive layer 120 and a second transparent conductive layer 122. During operation, the first transparent conductive layer 120 and the second transparent conductive layer 122 apply a voltage across the optically active layer 118 thereby generating an applied electric field. The electrochromic device 110 also includes a patterned conductive layer 124 disposed on the second transparent conductive layer 122. The patterned conductive layer 124 defines an array on the second transparent conductive layer 122 and partitions the electrochromic device 110 into a plurality of electrochromic cells. In some embodiments, features of the array are such that the patterned conductive layer is not visible to the naked eye.

In FIG. 1B, the array is depicted as a rectilinear array. However, this depiction is for purposes of illustration only. The array may include any combination of vertexes and segments therebetween that define a two-dimensional pattern across a surface 126 of the second transparent conductive layer 122. As will be described further in relation to FIG. 2, the patterned conductive layer 124 reduces sheet resistance effects associated with the second transparent conductive layer 122. The electrochromic device 110 can be disposed between two transparent substrates to create a sandwich structure. In some embodiments, the transparent substrates can be panes of glass 128, in other embodiments, the transparent substrates can be polymers, resins, or other types of transparent materials.

In operation, a voltage is applied across the optically active layer 118 using the first transparent conductive layer 120, the second transparent conductive layer 122, and the patterned conductive layer 124. In response to the applied voltage, the optically active layer 118 enters a transmissive state that regulates light passing through the electrochromic device 110. Such regulation includes altering an intensity of light, a spectral distribution of light, a polarization of light, or any combination thereof.

The transmissive state may be characterized by a percentage that ranges between a minimum transmittance (0% transmittance) and a maximum transmittance (100% transmittance).

By varying the voltage applied to the optically active layer 118, different transmissive states can be accessed. Such variation enables the electrochromic device 110 to selectively control the amount of the transmitted light 114 from the incoming light 112, and/or the amount of the reflected light 116. Thus, the electrochromic device 110 allows the selectively transparent panels 102 to control their transparency to light. In some embodiments, the voltage can be applied continuously to maintain a selected transmissible state. In other embodiments, the voltage need not be applied continuously to the optically active layer 118 to maintain the transmissive state. In these embodiments, the voltage need only be applied during a limited duration until the transmissive state is achieved. It will be appreciated that switching between different transmissive states can involve a time delay. This time delay would otherwise scale appreciably with a size of the plurality of selectively transparent panels 102 if the patterned conductive layer 124 were not present.

Figure 2:
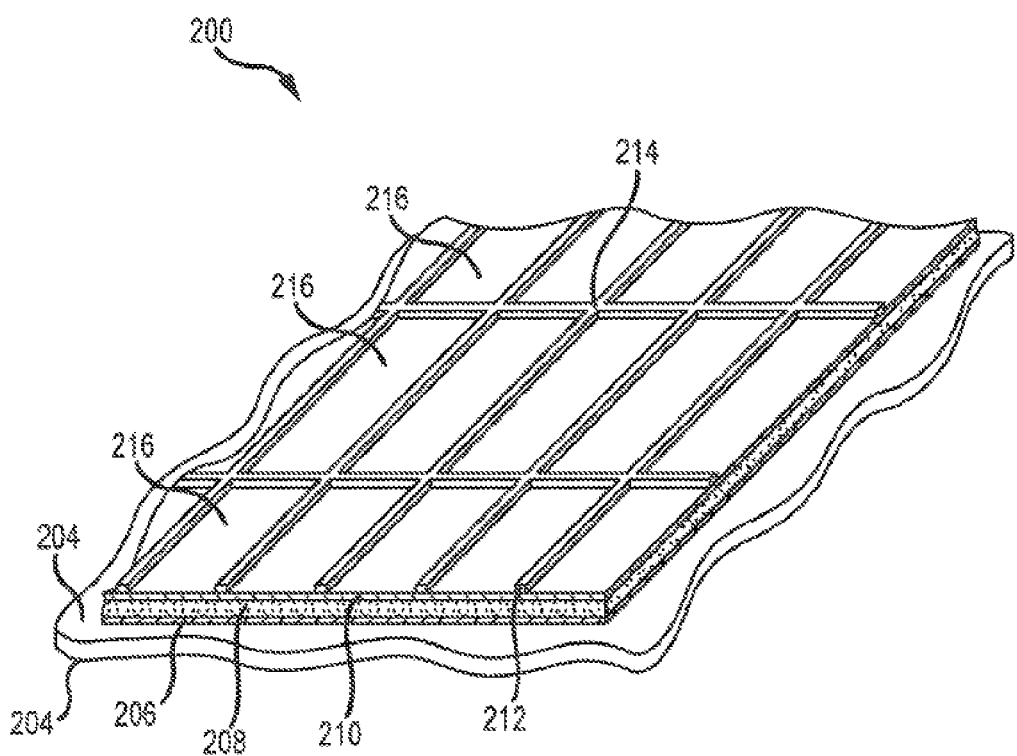
FIG. 2 is a perspective view of a cross-sectioned portion of an electrochromic device, according to an illustrative embodiment.

Referring to FIG. 2, a perspective view is presented of a cross-sectioned portion of an electrochromic device 200, according to an illustrative embodiment. The electrochromic device 200 includes a transparent substrate 202 having a surface 204. The transparent substrate 202 can be formed of an amorphous material such as a soda-lime glass or a borosilicate glass. The electrochromic device 200 also includes a first transparent conductive layer 206 disposed on the surface 204 of the transparent substrate 202. The first transparent conductive layer 206 is commonly a transparent conducting oxide (TCO), although other transparent conducting materials are possible. Non-limiting examples of transparent conducting oxides include F:SnO2, Sn:In2O3, and Al:ZnO. In other embodiments, the transparent conductive layer can be a zinc nitride material or a titanium nitride material.

An optically active layer 208 is disposed on the first transparent conductive layer 206 and configured to alter optical properties in response to an applied electric field (i.e., an applied voltage). During operation, the optical properties are altered to interact with an incoming light to produce a transmitted light. Such interaction can involve attenuating a spectral portion of the incoming light. The spectral portion may include an individual wavelength or a range of wavelengths. Attenuation of the incoming light may involve absorption, reflection, polarization, or combinations thereof. Other optical processes are possible. The applied voltage controls strength of attenuation and also establishes a transmissive state in the optically active layer 208.

In some embodiments, the optical properties can include an absorption spectrum of electromagnetic radiation. In these embodiments, wavelengths of the spectral portion can be absorbed in proportions defined by the absorption spectrum of electromagnetic radiation. In some embodiments, the optical properties can include a reflection spectrum of electromagnetic radiation. In these embodiments, wavelengths of the spectral portion can be reflected in proportions defined by the reflection spectrum of electromagnetic radiation.

In some embodiments, the optically active layer 208 can include an electrochromic layer, an ion conductive layer, and an ion storage layer. The electrochromic layer can incorporate a transition metal oxide such as NiO, V2O5, TiO2, Nb2O5, MoO3, Ta2O5, and WO3. Other materials, however, are possible (e.g., electrochromic polymers). The ion-conductive layer, which is disposed between the electrochromic layer and the ion storage layer, can include an electrolyte that allows ions to diffuse therethrough. Such ions may include H+, Li+, Na+, K+, or combinations thereof. The ion-conductive layer may be a polymeric electrolyte or a gel electrolyte. Other types of electrolytes are possible. The ion storage layer, or counter electrode, serves to receive ions from and release ions into the ion conductive layer. The ion storage layer is commonly formed of a transition metal oxide (e.g., NiO, V2O5, TiO2, etc.).

The electrochromic device 200 includes a second transparent conductive layer 210 disposed on the optically active layer 208. The second transparent conductive layer 210 can be a transparent conducting oxide (TCO), although other transparent conducting materials are possible. In some embodiments, the second transparent conductive layer 210 can comprise a transparent conducting oxide that is the same as the first transparent conducting layer 206. In other embodiments, the second transparent conductive layer 210 and the first transparent conductive layer 206 can be different transparent conducting oxide materials.

The electrochromic device 200 also includes a patterned conductive layer 212 disposed on the second transparent conductive layer 210 and defining an array 214 on the second transparent conductive layer 210. The array 214 partitions the electrochromic device 200 into a plurality of electrochromic cells 216. In FIG. 2, the array 214 is depicted as a rectilinear array. However, this depiction is not intended as limiting. The array 214 may include any pattern that defines two-dimensional cells across a surface of the second transparent conductive layer 210. For example, the array can be a series of cells that can be rectilinear, triangular-shaped, diamond-shaped, pentagonal-shaped, hexagonal-shaped, octagonal-shaped, combinations thereof, or any other geometric shape.

In some embodiments, features of the array 214 are such that the patterned conductive layer 212 is not visible to the naked eye. For example, and without limitation, the array 214 may include conductive nanowires. In another non-limiting example, the array 214 may be formed using a conductive ink that, when hardened or dried, provides semi-transparency. The conductive ink can include a fluid having a transparent, conductive polymer dissolved therein. The conductive ink can also include metallic particles, which may be nanoparticles. Other features, however, are possible for the array 214.

To overcome sheet resistances, the patterned conductive layer 212 can have a greater conductivity than the second transparent conductive layer 210. This greater conductivity allows an electrical charge to use the patterned conductive layer 212 as an alternate, lower-resistance electrical conduit during operation. The electrical charge distributes through the patterned conductive layer 212 and reaches areas throughout the second transparent conductive layer 210 having lost minimal voltage potential. Moreover, the plurality of electrochromic cells 216 subdivides the electrochromic device 200 into smaller regions, allowing the optically active layer 208 to experience a more uniform voltage distribution (or distribution in voltage potential). Deviations from the applied voltage can be reduced. Thus, by virtue of the patterned conductive layer 212, the transmissive state can emerge more evenly throughout the optically active layer 208, and switching times between transmissive states can be reduced.

In some embodiments, the patterned conductive layer 212 can include a portion that can generate heat by resistive heating. In these embodiments, heat flows through the second transparent conductive layer 210 and into the optically active layer 208.

In some embodiments, the patterned conductive layer 212 includes a metal selected from the group consisting of copper, aluminum, silver, and gold. In further embodiments, the metal includes nanoparticles having dimensions less than 750 nm. In some embodiments, the patterned conductive layer 212 includes a polymer material having a resistivity lower than $10^{-3}$ $\Box$-cm. In these embodiments, the polymer material may be transparent. Non-limiting examples of the polymer material include PEDOT, i.e., poly(3,4-ethylenedioxythiophene) and PEDOT:PSS, i.e., poly(3,4-ethylenedioxythiophene):poly(styrene sulfonate). In further embodiments, the polymer material incorporates particles of metal therein (e.g., Cu, Al, Ag, Ag, Pt, etc.). In some embodiments, the patterned conductive layer 212 includes carbon nanomaterials. Non-limiting examples of carbon nanomaterials include graphene, fullerenes, and carbon nanotubes.

In some embodiments, the electrochromic device 200 can further include a transparent layer, a portion of which forms an interface with the patterned conductive layer 212. The transparent layer can be bonded to the patterned conductive layer 212, the second transparent conductive layer 210, or both. The transparent layer may be a superstrate body, such as a glass pane. The transparent layer may also be a coating, such as an epoxy coating, a thermoplastic coating, or other organic-based coatings.

In some embodiments, the electrochromic device 200 can further include a power distribution circuit electrically coupled to the first transparent conductive layer 206 and the patterned conductive layer 212. In such embodiments, the power distribution circuit is configured to allow electrical power to selectively flow to individual cells in the plurality of electrochromic cells 216. The power distribution circuit may have an electrical power source coupled thereto. In some embodiments, the power distribution circuit includes an electrical switch. In these embodiments, the electrical switch is configured to regulate electrical power flowing to the individual cells in the plurality of electrochromic cells 216. This regulation may include selectively applying voltages to individual electrochromic cells 216 in order to produce patterns of transmissive states across the electrochromic device 200. Non-limiting examples of patterns include gradients in shading, step-contrasts between shaded and non-shaded regions, and shading that defines informational characters (e.g., text). Other types of patterns of transmissive states are possible.

In some embodiments, the electrochromic device 200 further includes a glass superstrate having a portion bonded onto the patterned conductive layer 212. In such embodiments, the transparent substrate 202 is a glass substrate. Moreover, the optically active layer 208 includes the electrochromic layer, the ion conductive layer, and the ion storage layer. The electrochromic layer is configured to alter the absorption spectrum of electromagnetic radiation in response to the applied electric field. In these embodiments, the patterned conductive layer can include a metal selected from the group consisting of copper, aluminum, silver, and gold. The patterned conductive layer can also include the polymer material having a low resistivity (e.g. lower than 10-3 Ω-cm). The polymer material may be utilized independently or in combination with the metal.

Figure 3:
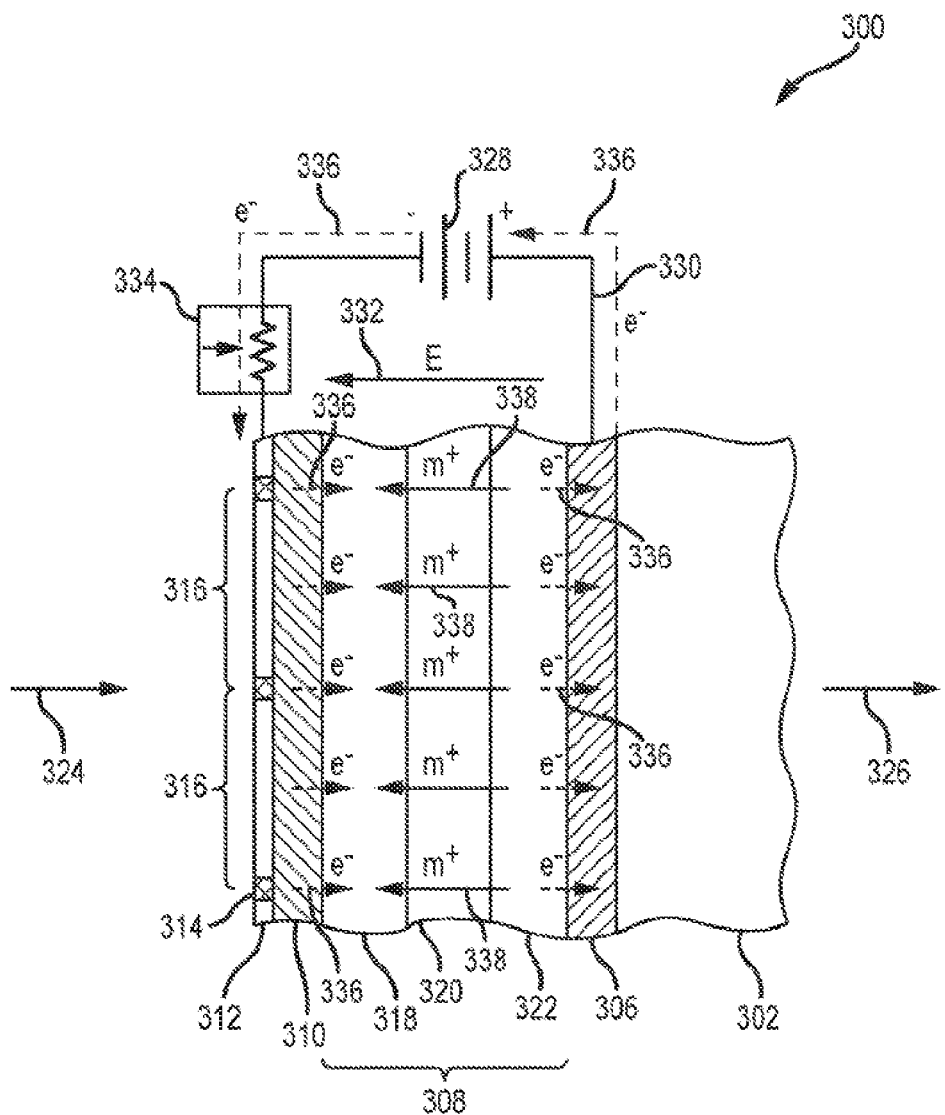
FIG. 3 is a portion of an electrochromic device, shown in cross-section, in which an optically active layer includes an electrochromic layer, an ion conductive layer, and an ion storage layer, according to an illustrative embodiment.

In operation, the electrochromic device 200 receives the incoming light and, depending on the optical properties altered by the optically active layer 208, produces the transmitted light. FIG. 3 presents a portion of an electrochromic device 300, shown in cross-section, in which the optically active layer 308 includes an electrochromic layer 318, an ion conductive layer 320, and an ion storage layer 322, according to an illustrative embodiment. An incoming light 324 is received by patterned conductive layer 312 and traverses the electrochromic device 300 to exit as a transmitted light 326. The transmitted light 326 is altered relative to the incoming light 324 due to optical interactions within the optically active layer 308.

An electrical power source 328 is coupled to the patterned conductive layer 312 and the first transparent conductive layer 306 via a power distribution circuit 330. FIG. 3 depicts the electrical power source 328 as a battery. However, this depiction is for purposes of illustration only. Other types of electrical power sources are possible. The power distribution circuit 330 enables the electrical power source 328 to apply a voltage between the patterned conductive layer 312 and the first transparent conductive layer 306. The voltage creates an electric field 332 within the optically active layer 308. An electrical switch 334 allows the voltage experienced by the electrochromic device 300 to be adjusted in magnitude. The electric field 332 scales in proportion to the applied (or adjusted) voltage. In FIG. 3, the electric switch is depicted as a potentiometer. However, this depiction is not intended as limiting. Other types of electric switches are possible (e.g., a transistor). The applied voltage induces a flow of current 336 within the power distribution circuit 330 that includes the electrochromic device 300. The flow of current 336 is illustrated in FIG. 3 by dashed arrows that represent a motion of negative charge (i.e., a motion of e−). It will be appreciated that the flow of current 336 moves in a direction opposite of the electric field 332 when traversing the electrochromic device 300.

The flow of current 336 delivers a negative charge to the electrochromic layer 318 via the first transparent conductive layer 306. In response, positive ions (i.e., M+) diffuse out of the ion storage layer 322, through the ion conductive layer 320, and into the electrochromic layer 318. Such diffusion occurs in a same direction as the applied current 336. The diffusion of positive ions 338 is depicted in FIG. 3 by solid arrows. Materials in the electrochromic layer 318 change composition upon receiving the flow of positive ions 338. This compositional change can alter the optical properties of the electrochromic layer 318. A non-limiting example of such compositional changes is provided below:

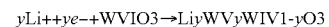

In this non-limiting example, lithium ions intercalate into tungsten oxide to produce a lithium tungstate compound. As intercalation proceeds, the lithium tungstate compound alters its absorption spectrum to favor blue wavelengths. Thus, an electrochromic layer incorporating tungsten oxide (i.e., WO3) would become increasingly blue in tint as lithium ions were increasingly absorbed. In other embodiments, other ion-metal oxide compounds can be used to alter the absorption to favor other colors/wavelengths.

The flow of positive ions 338 continues until the ion storage layer 322 becomes sufficiently depleted that the strength of the electric field 332 is unable to extract further ions. At this point, the optically active layer 308 exhibits a stable transmissive state. In some embodiments, the voltage can be removed yet the transmissive state persists. The optically active layer 308 can be switched into a new transmissive state by altering the voltage. For example, and without limitation, an electrochromic layer incorporating tungsten oxide (i.e., WO3) can increase in blue tint by applying a voltage higher than the previous voltage. Alternatively, the voltage could be reversed to decrease the blue tint. Other manipulations of the voltage are possible. In general, the voltage applied by the power distribution circuit 330 can be manipulated by the electrical switch 334 to transition the electrochromic device 300 between transmissive states. Such manipulation alters the optical properties of the optically active layer 308.

It will be appreciated that the patterned conductive layer 312 enables a more uniform voltage distribution than if the power distribution circuit 330 were coupled directly to the second transparent conductive layer 210. By virtue of its higher conductivity, the patterned conductive layer 312 serves as an alternate, lower-resistance electrical conduit for the flow of current 336. Moreover, the plurality of electrochromic devices 316 subdivide the electrochromic device 300 into smaller regions. The flow of current 336 therefore is able to distribute across the second transparent conductive layer 210 with minimal losses in voltage potential. As a result, the transmissive state emerges more evenly throughout the optically active layer 308 and switching times between transmissive states are reduced. In embodiments where the patterned conductive layer 312 generates heat, i.e., via a portion thereof, such heat is absorbed by the optically active layer 308. This heat increases ion diffusion within the optically active layer 308, further reducing switching times.

Figure 4:
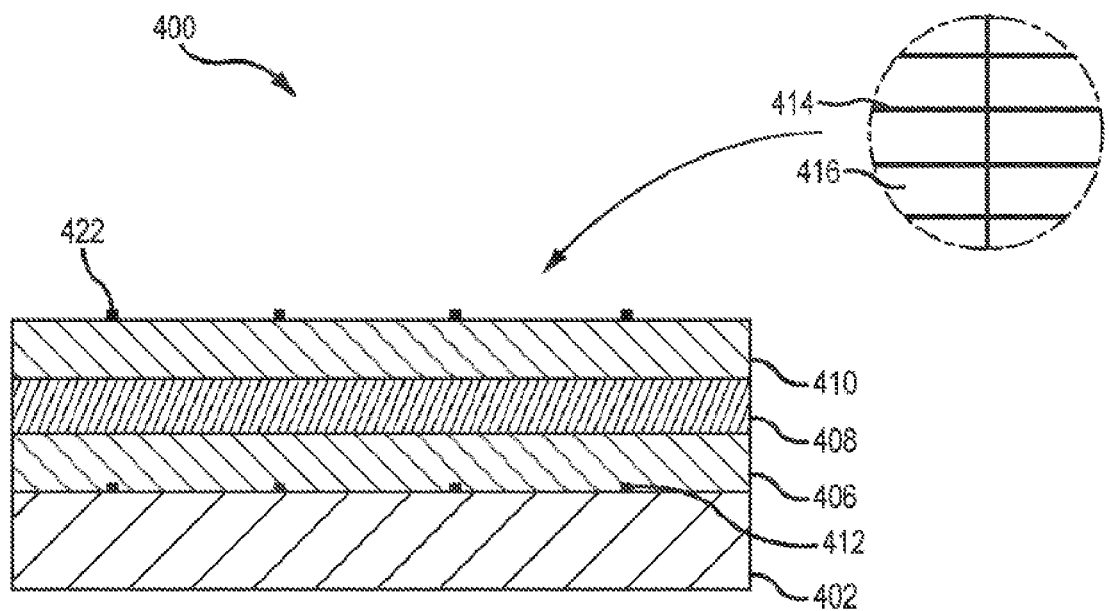
FIG. 4 is side view of a cross-sectioned portion of another electrochromic device with two patterned conductive layers and an insert of the top view thereof, according to an illustrative embodiment.

In some embodiments, the electrochromic device can include two patterned conductive layers. An optically active layer is disposed between the two patterned conductive layers. FIG. 4 depicts presents a cross-sectioned portion of an electrochromic device 400, according to an illustrative embodiment. The electrochromic device 400 includes a transparent substrate 402. As previously described, the transparent substrate 402 can be formed of an amorphous material such as, but not limited to, a soda-lime glass or a borosilicate glass. The electrochromic device 400 also includes a first transparent conductive layer 406 disposed the transparent substrate 402. The first transparent conductive layer 406 can be a transparent conducting oxide (TCO), although other transparent conducting materials are possible. Non-limiting examples of transparent conducting oxides include $F:SnO_2$, $Sn:In_2O_3$, and $Al:ZnO$. In other embodiments, the transparent conductive layer can be a zinc nitride material or a titanium nitride material.

An optically active layer 408 is disposed on the first transparent conductive layer 406, and is configured to alter optical properties in response to an applied electric field (i.e., an applied voltage). During operation, the optical properties are altered to interact with incoming light to produce transmitted light. Such interaction can involve attenuating a spectral portion of the incoming light. The spectral portion can include an individual wavelength or a range of wavelengths. Attenuation of the incoming light can involve absorption, reflection, polarization, or combinations thereof. Other optical processes are possible. The applied voltage controls strength of attenuation and can also establish a transmissive state in the optically active layer 208.

In some embodiments, the optically active layer 408 can include an electrochromic layer, an ion conductive layer, and an ion storage layer. The electrochromic layer can incorporate a transition metal oxide such as $NiO$, $V_2O_5$, $TiO_2$, $Nb_2O_5$, $MoO_3$, $Ta_2O_5$, and $WO_3$. Other materials are possible (e.g., electrochromic polymers). The ion-conductive layer, which is disposed between the electrochromic layer and the ion storage layer, can include an electrolyte that allows ions to diffuse therethrough. Such ions may include $H+$, $Li+$, $Na+$, $K+$, or combinations thereof. The ion-conductive layer may be a polymeric electrolyte or a gel electrolyte. Other types of electrolytes are possible. The ion storage layer, or counter electrode, serves to receive ions from and release ions into the ion conductive layer. The ion storage layer is commonly formed of a transition metal oxide (e.g., $NiO$, $V_2O_5$, $TiO_2$, etc.).

The electrochromic device 400 includes a second transparent conductive layer 410 disposed on the optically active layer 408. The second transparent conductive layer 410 can be a transparent conducting oxide (TCO), although other transparent conducting materials are possible. In some embodiments, the second transparent conductive layer 410 can comprise a transparent conducting oxide that is the same as the first transparent conducting layer 406. In other embodiments, the second transparent conductive layer 410 and the first transparent conductive layer 406 can be different transparent conducting oxide materials.

The electrochromic device 400 also includes a first patterned conductive layer 412 disposed on the first transparent conductive layer 406. The electrochromic device 400 also includes a second patterned conductive layer 422 disposed on the second transparent conductive layer 410. Collectively, the first patterned conductive layer 412 and the second patterned conductive layer 422 define an array 414 that partitions the electrochromic device 400 into a plurality of electrochromic cells 416. The array 414 partitions the electrochromic device 400 into a plurality of electrochromic cells 416.

In FIG. 4, the array 414 is depicted as a rectilinear array. However, this depiction is not intended as limiting. The array 414 may include any pattern that defines three-dimensional cells across the optically active layer 408. For example, the array can be a series of cells that can be rectilinear, triangular-shaped, diamond-shaped, pentagonal-shaped, hexagonal-shaped, octagonal-shaped, combinations thereof, or any other geometric shape.

In some embodiments, features of the array 414 are such that the patterned conductive layers 412 and 422 are not visible to the naked eye. For example, and without limitation, the array 414 may include conductive nanowires. In another non-limiting example, the array 414 may be formed using a conductive ink that, when hardened or dried, provides semi-transparency. The conductive ink can include a fluid having a transparent, conductive polymer dissolved therein. The conductive ink can also include metallic particles, which may be nanoparticles. Other features, however, are possible for the array 414.

To overcome sheet resistances, the patterned conductive layers 412 and 422 can have greater conductivity than the first and second transparent conductive layers 406 and 410. This greater conductivity allows an electrical charge to use the patterned conductive layers 412 and 422 as an alternate, lower-resistance electrical conduit during operation. The electrical charge distributes through the patterned conductive layers 412 and 422, and reaches areas throughout the transparent conductive layers 406 and 410 having lost minimal voltage potential. Moreover, the plurality of electrochromic cells 416 subdivides the electrochromic device 400 into smaller regions, allowing the optically active layer 408 to experience a more uniform voltage distribution (or distribution in voltage potential). Thus, by virtue of the patterned conductive layers 412 and 422, the transmissive state can emerge more evenly throughout the optically active layer 408, and switching times between transmissive states can be reduced.

In some embodiments, the electrochromic device 400 can further include a transparent layer (not shown), a portion of which forms an interface with the second patterned conductive layer 422. The transparent layer can be bonded to the second patterned conductive layer 422, the second transparent conductive layer 410, or both. The transparent layer may be a superstrate body, such as a glass or plexiglass pane. The transparent layer may also be a coating, such as an epoxy coating, a thermoplastic coating, or other organic-based coatings.

In some embodiments, like the electrochromic device 200, electrochromic device 400 can further include a power distribution circuit electrically coupled to the transparent conductive layers 406 and 410 and the patterned conductive layers 412 and 422. In such embodiments, the power distribution circuit is configured to allow electrical power to selectively flow to individual cells in the plurality of electrochromic cells 416. The power distribution circuit may have an electrical power source coupled thereto. In some embodiments, the power distribution circuit includes an electrical switch. In these embodiments, the electrical switch is configured to regulate electrical power flowing to the individual cells in the plurality of electrochromic cells 416. This regulation may include selectively applying voltages to individual electrochromic cells 416 in order to produce patterns of transmissive states across the electrochromic device 400. Non-limiting examples of patterns include gradients in shading, step-contrasts between shaded and non-shaded regions, and shading that defines informational characters (e.g., text). Other types of patterns of transmissive states are possible.

Figure 5:
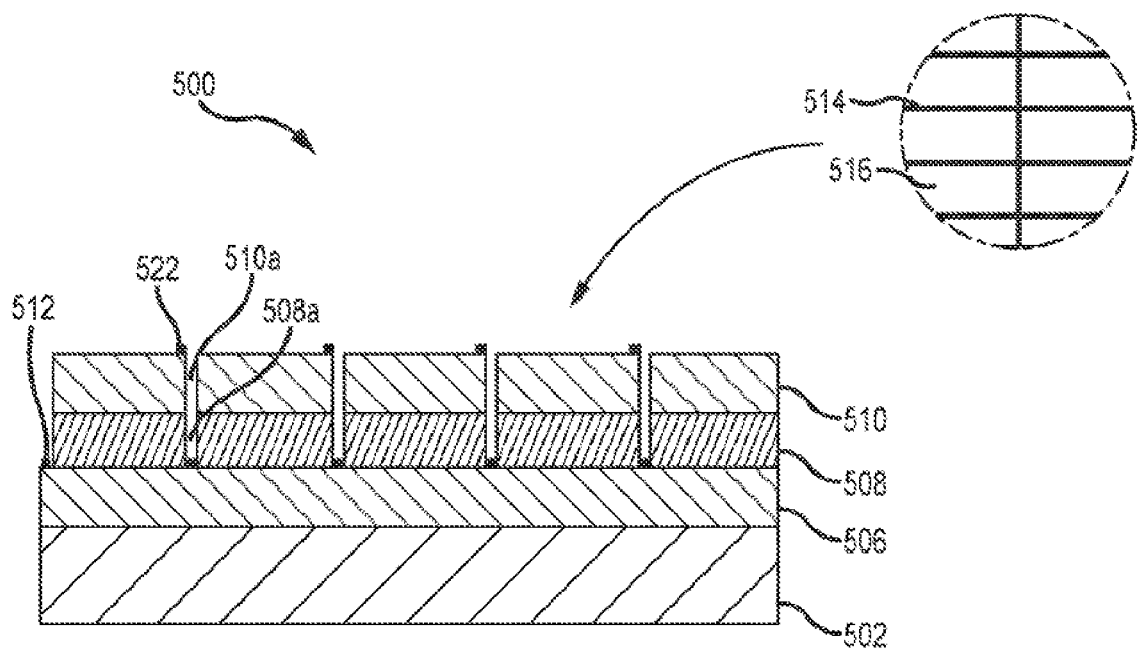
FIG. 5 is a side view of a cross-sectioned portion of an electrochromic device with portions of the optically active layer and second transparent conductive layer removed and an insert of the top view thereof, according to an illustrative embodiment.

In some embodiments the electrochromic device can have portions of a transparent conductive layer and the optically active layer removed to further partition the device into electrochromic cells. FIG. 5 depicts presents a cross-sectioned portion of an electrochromic device 500, according to an illustrative embodiment. The electrochromic device 500 includes a transparent substrate 502. As previously described, the transparent substrate 502 is typically formed of an amorphous material such as a soda-lime glass or a borosilicate glass. The electrochromic device 500 also includes a first transparent conductive layer 506 disposed on the transparent substrate 502. The first transparent conductive layer 506 is commonly a transparent conducting oxide (TCO), although other transparent conducting materials are possible. Non-limiting examples of transparent conducting oxides include F:SnO2, Sn:In2O3, and Al:ZnO. In other embodiments, the transparent conductive layer can be a zinc nitride material or a titanium nitride material.

An optically active layer 508 is disposed on the first transparent conductive layer 506 and configured to alter optical properties in response to an applied electric field (i.e., an applied voltage). In some embodiments, the optically active layer 508 can include an electrochromic layer, an ion conductive layer, and an ion storage layer. The electrochromic layer can incorporate a transition metal oxide such as NiO, V2O5, TiO2, Nb2O5, MoO3, Ta2O5, and WO3. Other materials, however, are possible (e.g., electrochromic polymers). The ion-conductive layer, which is disposed between the electrochromic layer and the ion storage layer, can include an electrolyte that allows ions to diffuse therethrough. Such ions may include H+, Li+, Na+, K+, or combinations thereof. The ion-conductive layer may be a polymeric electrolyte or a gel electrolyte. Other types of electrolytes are possible. The ion storage layer, or counter electrode, serves to receive ions from and release ions into the ion conductive layer. The ion storage layer is commonly formed of a transition metal oxide (e.g., NiO, V2O5, TiO2, etc.).

The electrochromic device 500 includes a second transparent conductive layer 510 disposed on the optically active layer 508. The second transparent conductive layer 510 can be a transparent conducting oxide (TCO), although other transparent conducting materials are possible. In some embodiments, the second transparent conductive layer 510 can comprise a transparent conducting oxide that is the same as the first transparent conducting layer 506. In other embodiments, the second transparent conductive layer 510 and the first transparent conductive layer 506 can be different transparent conducting oxide materials.

The electrochromic device 500 also includes a first patterned conductive layer 512 disposed between the first transparent conductive layer 506 and the optically active layer 508. The electrochromic device 500 also includes a second patterned conductive layer 522 disposed on the second transparent conductive layer 510. Collectively, the first patterned conductive layer 512 and the second patterned conductive layer 522 define an array 514 along with the optically active layer 508 that partitions the electrochromic device 500 into a plurality of electrochromic cells 516.

Further, the electrochromic cells 516 can be defined by removing select portions of the optically active layer 508 and the second transparent conductive layer 510. As shown in FIG. 5, it is illustrated that selective portions 508a of the optically active layer and selective portions 510a of the second transparent conductive layer that correspond to the pattern of the first and second patterned conductive layers 512 and 522 are removed. To remove portions 508a of the optically active layer and portions 510a of the second transparent conductive layer, the optically active layer 508 and the second transparent conductive layer 510 can be selectively ablated. In some embodiments, portions 508a of the optically active layer and portions 510a of the second transparent conductive layer can be removed by laser ablation by heating portions 508a and portions 510a to evaporate or sublimate the portions. Other possible methods for ablation are possible In other embodiments, portions 508a of the optically active layer and portions 510a can be removed by using a lithography process. In such embodiments, the optically active layer may be deposited along with the use of a mask that is patterned. The patterned mask can be overlaid on the first transparent conductive layer 506 such that regions of the first transparent conductive layer are covered with the mask thereby preventing the deposition of the optically active layer on the first transparent conductive layer 506. These regions correspond to portions 508a of the optically active layer. Then, the second transparent layer 510 can be deposited on the optically active layer 508 while the mask is still overlaid on the first transparent conductive layer 506. The regions of the mask that cover the first transparent conductive layer 506 also correspond to portions 510a of the second transparent conductive layer 510. After deposition of the optically active layer 508 and the second transparent conductive layer 510, the mask can be removed such that portions of the first transparent conductive layer 506 are exposed. Then, the first patterned conductive layer 512 can be deposited on the exposed portions of the first transparent conductive layer 506 to create array 516. In other embodiments, the first patterned conductive layer 512 may be deposited before the optically active layer 508 and the second transparent layer 510. In such embodiments, the mask is overlaid on both the first transparent conductive layer 506 and the first patterned conductive layer 512.

In FIG. 5, the array 514 is depicted as a rectilinear array, like electrochromic devices 200 and 400. However, this depiction is not intended as limiting. The array 514 may include any pattern that defines three-dimensional cells across the optically active layer 508. For example, the array can be a series of cells that can be rectilinear, triangular-shaped, diamond-shaped, pentagonal-shaped, hexagonal-shaped, octagonal-shaped, combinations thereof, or any other geometric shape.

In some embodiments, features of the array 514 are such that the patterned conductive layers 512 and 522 are not visible to the naked eye. For example, and without limitation, the array 514 may include conductive nanowires. In another non-limiting example, the array 514 may be formed using a conductive ink that, when hardened or dried, provides semi-transparency. The conductive ink can include a fluid having a transparent, conductive polymer dissolved therein. The conductive ink can also include metallic particles, which may be nanoparticles. Other features, however, are possible for the array 514.

Like the previously described embodiments, o overcome sheet resistances, the patterned conductive layers 512 and 522 can have greater conductivity than the first and second transparent conductive layer 506 and 510. This greater conductivity allows an electrical charge to use the patterned conductive layers 512 and 522 as an alternate, lower-resistance electrical conduit during operation. The electrical charge distributes through the patterned conductive layers 512 and 522, and reaches areas throughout the transparent conductive layers 506 and 510 having lost minimal voltage potential. Moreover, the plurality of electrochromic cells 516 subdivides the electrochromic device 500 into smaller regions, allowing the optically active layer 408 to experience a more uniform voltage distribution (or distribution in voltage potential). Thus, by virtue of the patterned conductive layers 512 and 522, the transmissive state can emerge more evenly throughout the optically active layer 508, and switching times between transmissive states can be reduced.

In some embodiments, the electrochromic device 500 can further include a transparent layer (not shown), a portion of which forms an interface with the second patterned conductive layer 522. The transparent layer can be bonded to the second patterned conductive layer 522, the second transparent conductive layer 510, or both. The transparent layer may be a superstrate body, such as a glass pane. The transparent layer may also be a coating, such as an epoxy coating, a thermoplastic coating, or other organic-based coatings.

In some embodiments, like electrochromic devices 200 and 400, electrochromic device 500 can further include a power distribution circuit electrically coupled to the transparent conductive layers 506 and 510 and the patterned conductive layers 512 and 522. In such embodiments, the power distribution circuit is configured to allow electrical power to selectively flow to individual cells in the plurality of electrochromic cells 516. The power distribution circuit may have an electrical power source coupled thereto. In some embodiments, the power distribution circuit includes an electrical switch. In these embodiments, the electrical switch is configured to regulate electrical power flowing to the individual cells in the plurality of electrochromic cells 516. This regulation may include selectively applying voltages to individual electrochromic cells 516 in order to produce patterns of transmissive states across the electrochromic device 500. Non-limiting examples of patterns include gradients in shading, step-contrasts between shaded and non-shaded regions, and shading that defines informational characters (e.g., text). Other types of patterns of transmissive states are possible.

Although the illustrative embodiments describe the electrochromic devices as being incorporated into windows, the electrochromic device can be incorporated into other transparent panels. For example, by way of illustration without intending to be limiting, the electrochromic device can be incorporated in the glass covers for portable electronic devices or other devices.

According to an illustrative embodiment, a method of manufacturing an electrochromic device includes forming an optically active layer onto a first transparent conductive layer. The optically active layer is configured to alter optical properties in response to an applied electric field. The first transparent conductive layer is disposed on a portion of a transparent substrate. The method also includes depositing a second transparent conductive layer onto the optically active layer and patterning a conductive material into an array on the second transparent conductive layer. The array partitions the electrochromic device into a plurality of electrochromic cells. In some embodiments, the method further involves bonding a transparent superstrate to the array of patterned conductive material. In some embodiments, the optically active layer includes an electrochromic layer, an ion conductive layer, and an ion storage layer.

In some embodiments, patterning the conductive material into the array includes manipulating a precursor fluid onto the second transparent conductive layer using a process selected from the group consisting of rotogravure printing, ink-jet printing, screen-printing, and stamping.

In some embodiments, patterning the conductive material into the array can include coating a photoresist layer onto the second transparent conductive layer. The patterning the conductive material into the array can also include exposing a portion of the photoresist layer to an electromagnetic radiation. The portion corresponds to a configuration of the array. Patterning the conductive material into the array can also involve removing, after exposure to the electromagnetic radiation, the portion. Such removal can define an opening through the photoresist layer. The patterning the conductive material into the array additionally involves depositing the conductive material onto the second transparent conductive layer through the opening and removing an unexposed portion of the photoresist layer from the second transparent conductive layer. In further embodiments, exposing the portion of the photoresist layer can include receiving a beam of electromagnetic radiation from a laser writing system.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings

What is claimed is:

1. An electrochromic device, comprising:
   an optically active layer having a transmissivity that is alterable by application of electrical power to the optically active layer;
   a conductive layer that is disposed directly on the optically active layer on a first side of the optically active layer;
   and
   a patterned conductive layer that is disposed directly on the conductive layer and that defines electrochromic cells within the optically active layer,
   wherein the patterned conductive layer is configured to supply electrical power to the electrochromic cells individually, such that when a first amount of electrical power that is delivered to a first one of the electrochromic cells differs from a second amount of electrical power that is delivered to a second one of the electrochromic cells, varying transmissive states are produced within the optically active layer.

2. The electrochromic device of claim 1, wherein the conductive layer is a first conductive layer, the electrochromic device further comprising:
   a second conductive layer that is disposed on the optically active layer on a second side of the optically active layer so that the optically active layer is positioned between the first conductive layer and the second conductive layer.

3. The electrochromic device of claim 2, wherein the patterned conductive layer has greater conductivity than the first conductive layer.

4. The electrochromic device of claim 3, wherein the patterned conductive layer is a first patterned conductive layer, the electrochromic device further comprising:
a second patterned conductive layer that is formed on the second conductive layer, the second patterned conductive layer having greater conductivity than the second conductive layer.

5. The electrochromic device of claim 1, further comprising:
a power distribution circuit that is electrically coupled to the first patterned conductive layer.

6. The electrochromic device of claim 5, wherein the power distribution circuit comprises an electrical switch that regulates electrical power flowing to individual ones of the electrochromic cells.

7. The electrochromic device of claim 1, wherein the optically active layer comprises an electrochromic layer, an ion conductive layer, and an ion storage layer.

8. An electrochromic device, comprising:
a transparent substrate;
a first transparent conductive layer that is disposed on the transparent substrate;
an optically active layer that is disposed on the first transparent conductive layer;
a second transparent conductive layer that is disposed on the optically active layer; and
a patterned conductive layer that defines an array of electrochromic cells in the optically active layer, the patterned conductive layer configured to selectively supply electrical power to portions of the array, thereby enabling the electrochromic cells to exhibit different transmissive states relative to one another.

9. The electrochromic device of claim 8, wherein the patterned conductive layer is a first patterned conductive layer, the first patterned conductive layer disposed on the first transparent conductive layer and having a greater conductivity than the first transparent conductive layer.

10. The electrochromic device of claim 9, further comprising:
a second patterned conductive layer, the second patterned conductive layer disposed on the second transparent conductive layer and having a greater conductivity than the second transparent conductive layer.

11. The electrochromic device of claim 10, wherein the first patterned conductive layer supplies electrical power to the optically active layer through the first transparent conductive layer, and the second patterned conductive layer supplies electrical power to the optically active layer through the second transparent conductive layer.

12. The electrochromic device of claim 8, further comprising:
a power distribution circuit that is electrically coupled to the first patterned conductive layer.

13. The electrochromic device of claim 12, wherein when the power distribution circuit delivers a first amount of electrical power to a first electrochromic cell of the array and a second amount of electrical power to a second electrochromic cell of the array, the second amount of electrical power different from the first amount of electrical power, differing transmissive states are produced in the optically active layer.

14. The electrochromic device of claim 8, wherein the optically active layer comprises an electrochromic layer, an ion conductive layer, and an ion storage layer.

15. An electrochromic device, comprising:
an optically active layer having an optical property that can be altered by supplying electrical power to the optically active layer; and
at least one conductive layer that is disposed directly on the optically active layer, the at least one conductive layer configured to supply the electrical power to the optically active layer, the at least one conductive layer including patterned conductive elements that cooperate with the optically active layer to define electrochromic cells,
wherein the patterned conductive elements are configured for regulated electrical power delivery to each of the electrochromic cells.

16. The electrochromic device of claim 15, further comprising:
a power distribution circuit that is configured to supply the electrical power to the at least one conductive layer to control the optical property of the optically active layer to simultaneously produce a first transmissive state in a first one of the electrochromic cells and a second transmissive state that is different from the first transmissive state in a second one of the electrochromic cells.

17. The electrochromic device of claim 15, wherein the at least one conductive layer includes a first conductive layer that is located on a first side of the optically active layer and a second conductive layer that is located on a second side of the optically active layer.

18. The electrochromic device of claim 17, wherein the patterned conductive elements include a first group of patterned conductive elements that are formed on the first conductive layer and a second group of patterned conductive elements that are formed on the second conductive layer.

19. The electrochromic device of claim 15, wherein the optical property is an absorption spectrum of electromagnetic radiation.

20. The electrochromic device of claim 15, wherein the optical property is a reflection spectrum of electromagnetic radiation.

* * * * *